United States Patent [19]
Hugron

[11] Patent Number: 5,160,111
[45] Date of Patent: Nov. 3, 1992

[54] COLLAPSIBLE SIGNALLING POST

[76] Inventor: Denis P. Hugron, 1855, Georges, St-Hubert, Quebec, Canada, J4T 1W2

[21] Appl. No.: 822,712
[22] Filed: Jan. 21, 1992
[51] Int. Cl.⁵ ................................................. F16B 7/00
[52] U.S. Cl. ..................... 248/548; 248/545; 248/900; 248/156; 52/98; 403/2; 404/10; 40/608
[58] Field of Search ............... 248/548, 545, 900, 156; 52/98; 403/2; 404/10; 40/606, 608

[56] References Cited

U.S. PATENT DOCUMENTS

| | | | |
|---|---|---|---|
| 1,977,175 | 10/1934 | Davis | 403/2 X |
| 3,349,531 | 10/1967 | Watson | 52/98 X |
| 3,628,296 | 12/1971 | Henry | 52/98 |
| 3,912,405 | 10/1975 | Katt | 403/2 |
| 4,636,109 | 1/1987 | Clausen et al. | 40/608 X |
| 5,082,231 | 1/1992 | Knowles | 248/545 |

Primary Examiner—Alvin C. Chin-Shue
Attorney, Agent, or Firm—Roland L. Morneau

[57] ABSTRACT

The novel collapsible signalling post is provided with a weakened section characterized by an helical groove carved on the periphery of a tubular member to mounted between an anchoring member and a rod member supporting a sign. The groove provides a weakened section adapted to split open along a portion thereof and upon bending caused by a lateral force exerted on the signalling post, the two end portions of the tubular member remain connected to each other by the unfolded spires formed between the helicoidal thread.

10 Claims, 3 Drawing Sheets

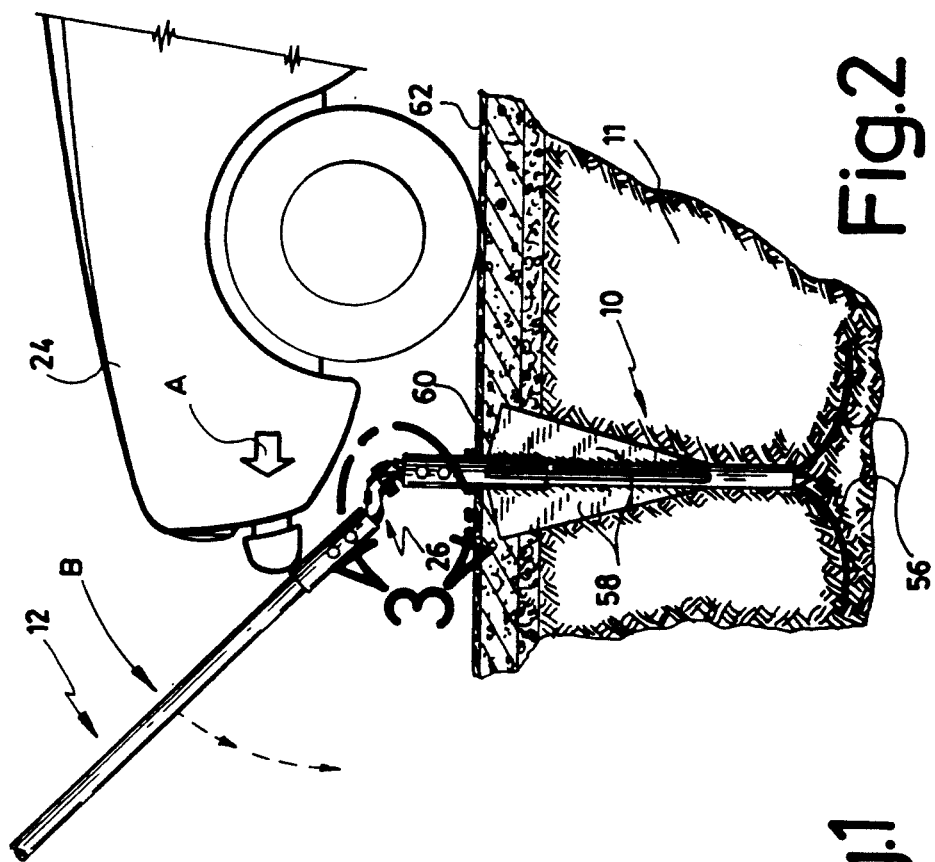
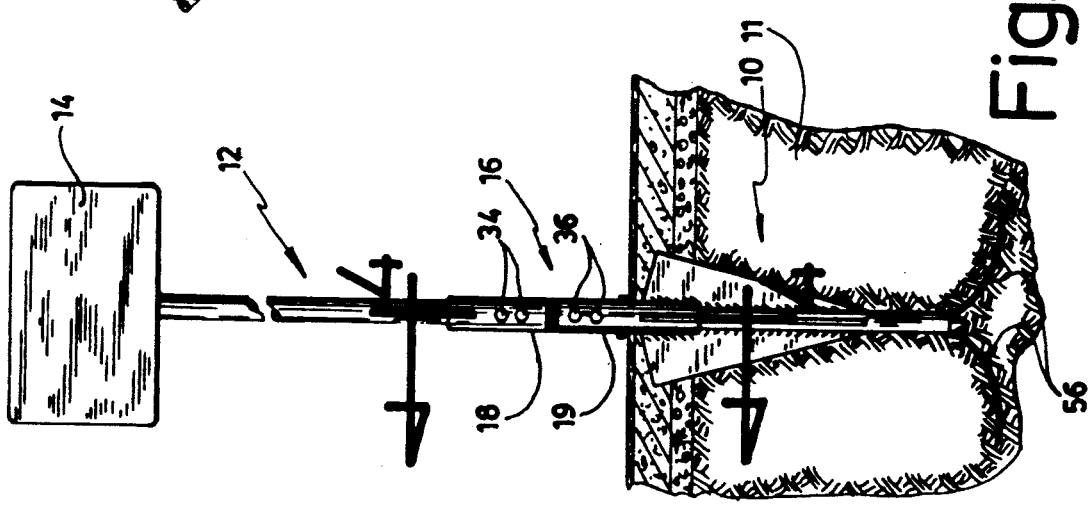

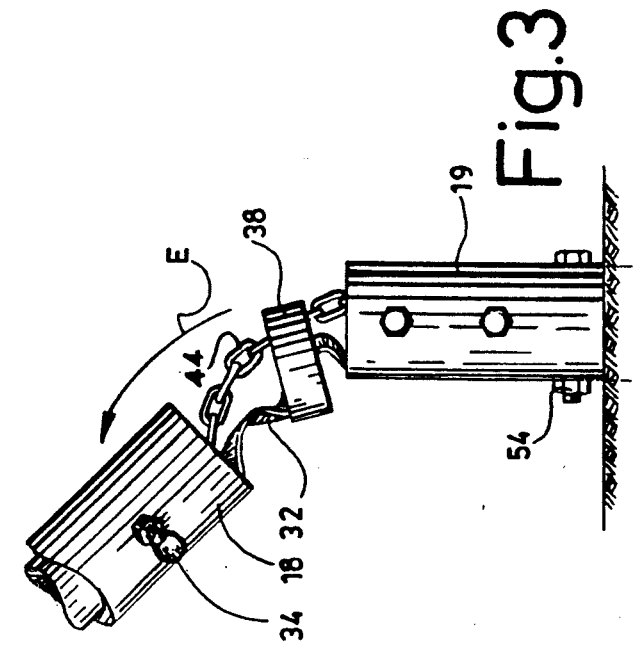
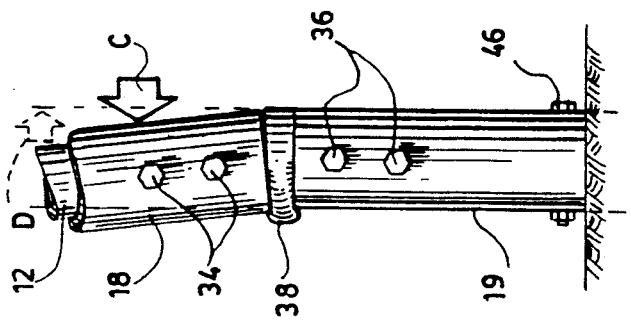
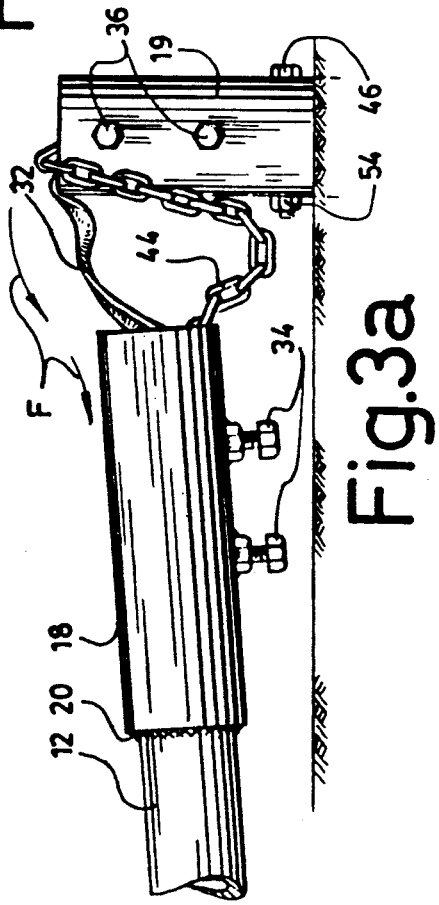
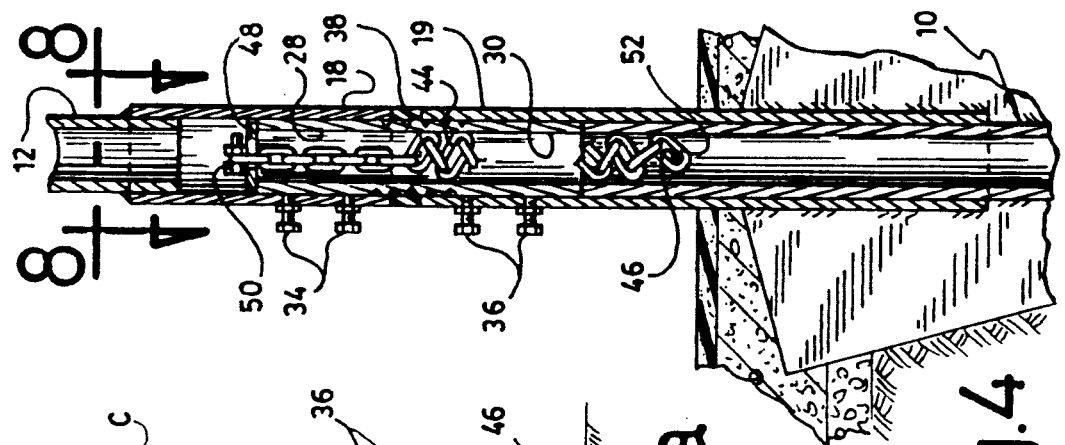

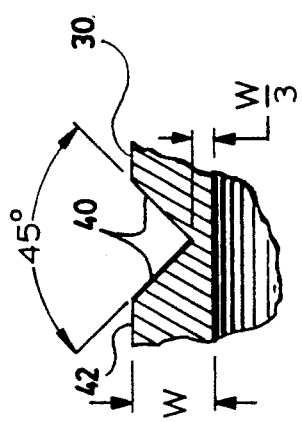
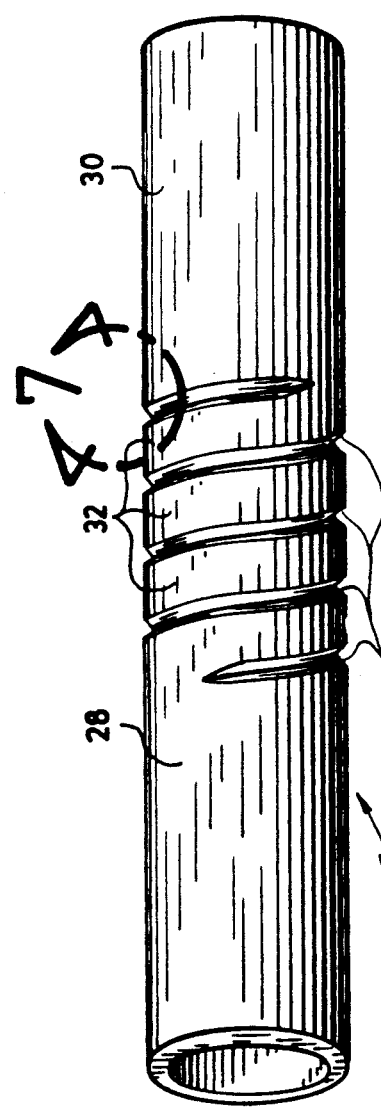
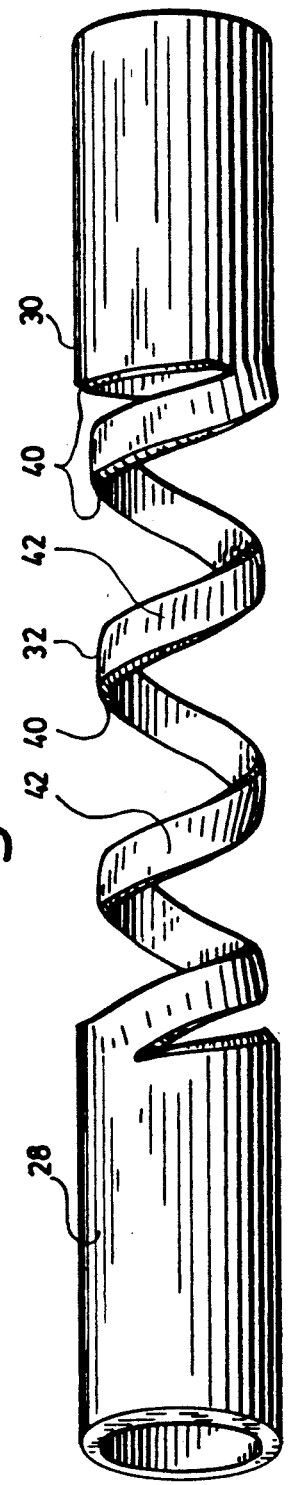

COLLAPSIBLE SIGNALLING POST

BACKGROUND OF THE INVENTION

1. Field of the Invention

The present invention relates to a post provided with a weakened section adapted to collapse when hit sideways. The section is particularly structured so as to retain the post to its anchor and accordingly prevent surrounding persons from being hit by a projected post or the recoil of the post.

2. Prior Art

A search made by the inventor has failed to reveal pertinent references. Flexible posts have been contemplated to prevent the breaking of posts when hit such as in U.S. Pat. No. 5,029,783. Flexible posts have a recoil effect which is eliminated by the present invention.

SUMMARY OF THE INVENTION

The invention is directed to a collapsible signalling post having a tubular member mounted between an anchoring member and a rod member which is sufficiently rigid for upstandingly supporting the rod member and which is resiliently pliable and unrecoilingly stretchable, whereby, upon lateral force exerted on the rod member, the rod member will remain connected to the anchoring member by the aforementioned tubular member.

The tubular member is particularly characterised by a lower part connectable to the anchoring member, by an upper part connectable to the rod member and a middle part characterized by a helical groove carved on the periphery of the tubular member for providing a weakened section adapted to split open along a portion thereof upon bending caused by a lateral force exerted on the rod member, whereby the upper and the lower parts remain connected to each other along a portion of the helicoidal thread.

The tubular member is particularly hollow and is preferably made of steel.

An added security device is provided to prevent the anchoring member and the rod member from being completely disconnected from each other. It consists of a flexible link connected to both ends of the tubular member. The link has a length longer than the length of the tubular member but is intended to refrain the tubular member from stretching beyond a predetermined distance or from breaking completely.

BRIEF DESCRIPTION OF THE DRAWINGS

FIG. 1 is a side view of a signalling post according to the invention shown in a cross-section of the ground where it is inserted, FIGS. 2, 2a and 3a are views similar to FIG. 1 showing the signalling post after being hit by a car, FIG. 3 is an enlarged view of the encircled portion 3 shown in FIG. 2, FIG. 4 is a cross-sectional view taken along line 4—4 of FIG. 1, FIG. 5 is a perspective view of a resistently pliable and unrecoilingly stretchable tubular member, FIG. 6 is a view of the tubular member shown in FIG. 5 in a stretched condition, FIG. 7 is a cross-sectional view of encircled portion 7 of FIG. 5, FIGS. 8 and 8a are two alternative embodiments of a cross-sectional view along line 8—8 of FIG. 4.

DETAILED DESCRIPTION OF THE INVENTION

FIG. 1 illustrates an anchoring member 10 secured into the ground 11 and a rod member 12 supporting a sign 14. A split sleeve 16 has an upper part 18 which is welded at 20 to the rod member 12 and a lower part 22 which is secured to the anchoring member 10. As shown in FIG. 2, the signalling post shown in FIG. 1 is adapted to be collapsible when hit by a lateral force such a car 24 pushing in the direction of the arrow A. According to the invention, the rod member 12 will tilt in the direction of the arrow B but remains connected to the anchoring device 10 by means of a tubular member 26 of the type illustrated in FIG. 5.

The tubular member 26 has an upper part 28, a lower part 30 and a middle part 32. The upper part 28 is located in the throat of the upper part 18 of the sleeve 16 and secured thereinto by a pair of fastening bolts 34. The lower part 30 of the tubular member 26 is tightly secured into the lower part 19 of the sleeve 16 by a pair of tightening bolts 36.

As shown in cross-section in FIG. 4, the lower part 30 of the sleeve 26 rests on the upper part of the anchoring device 10 and is fastened thereinto by the bolts 36. The upper part 28 of the tubular member 26 which extends above the upper edge of the lower part 19 of the sleeve 16 is covered by the upper part 18 of the sleeve 16 and secured thereinto by the bolts 34. A ring 38 is preferably disposed between the lower edges of part 18 and the upper edge of part 19. This ring is made of a flexible material such as synthetic rubber. The ring 38 has a rigidity to be able to support the rod member 12 but is sufficiently flexible to squeeze when a very small amount of lateral pressure in the direction of the arrow C is exerted on the rod member 12, such pressure being within the modulus of elasticity of the elements of the post under tension and accordingly will permit the rod member 12 to return to its original position in the direction of the arrow D. Such small deflection will produce a contraction of the ring 38 as shown in FIG. 2a.

The preferred embodiment of the tubular member 26 is illustrated in FIG. 5 wherein the metal part has a helicoidal groove which extends over, at least, a complete circumference of the tubular member 26 and which, preferably, extends over about five whorls. For a hollow cylindrical tubular member having a diameter of about 1½ to 2 inches, a wall thickness of about ⅛ of an inch made of mild steel, a groove having a depth about ⅔ of the thickness of the wall provides a desired resistance to lateral blows produced by a car hitting such a signalling post. A groove 40 having an angle of about 45 degrees allows the material of the tubular member to bend without undesirable resistance. However, the width of the strip between two whorls is wide enough, i.e. a minimum of ⅜ inch to prevent separation of the upper part 28 from the lower part 30.

When a solid blow is exerted on the rod member in the direction of the arrow E (see FIG. 3), the middle part 32 will be under such stress as to break along the weakened section, that is, along the groove 40. If the pressure is maintained in the direction of the arrow E, the whorls 42 between the grooves 40 will stretch away while maintaining a connection between the upper part 28 and the lower part 30 of the tubular member 26. As shown in FIG. 2a, the tubular member 26 is resistantly pliable but becomes unrecoilably stretchable when it reaches the position shown in FIG. 3.

As shown in FIG. 3a, the lower part 19 of the sleeve 16 may be made sufficiently short as to allow the car such as 24 shown in FIG. 2, to pass over the signalling post without being hindered. In such a case, the upper part 18 of the sleeve 16 and rod member 12 may stretch more extensively the middle part 32 of the tubular member 26 in the direction of the arrow F.

If under certain unusual circumstances, the coil strip 32 is stretched beyond a predetermined limit, an additional security link such as a chain 44 is provided to maintain the connection between the upper part 18 and the lower part 19 of the sleeve 16. The lower part of the chain 44 is retained at its lower end to a bolt 46 passing across the lower part 19 of the sleeve 16 and across the upper part of the anchoring member 10. The upper part of the chain 44 is inserted through the aperture of a washer 48 and held on the upper surface of the washer by a bolt 50 which extends across the aperture in the washer 48. The washer 48 has a dimension and more specifically a circumference such as to rest on the top of the upper part 28 of the tubular member 26.

The chain 44 is installed in its place before the rod member 12 and in particular before the sleeve part 18 is secured to the upper part 28 of the tubular member 26. The lower part of the chain 44 is lowered inside the tubular member 26 before the bolt 46 is inserted through the upper part of the anchoring member 10. When the lowermost ring 52 of the chain 44 is at the level of the apertures through which the bolt 46 extends, the latter is passed across the ring 52. The bolt 46 is subsequently held in place by the nut 54. Because the chain 44 can extend much higher than the top edge of the upper part 28 of the tubular member 26, it can be fixed as described above to the washer 48, the latter being subsequently dropped over the upper edge of part 26. The length of the chain is predetermined so as to be longer than the whorls 42 when fully stretched. Accordingly, even when the middle part 32 of the tubular member reaches its breaking point, the rod member 12 will be retained to the anchoring member 10 and accordingly will not be projected and will not produce a recoiling effect and accordingly will not produce any unintentional collision of the rod member with neighboring objects or persons.

The anchoring member 10 may be of the type disclosed by in U.S. Pat. No. 5,010,698 on Apr. 30, 1991 to the present applicant. The anchoring device 10 is retained in the ground by prongs 78 which are projected according to the above mentioned patent and by fins which extend radially around the core of the anchoring member 10. The fins 58 are downwardly tapered to facilitate the penetration of the anchoring member in the ground and their upper edge 60 are also downwardly tapered in order not to interfere with the top surface 62 of the ground 11. The tapering of the upper edges 60 is particularly useful when the anchoring member is located in a hilly portion of the ground. The number of fins 58 is preferably three which are evenly disposed around the core of the anchoring member 10, that is, separated by 120 degrees from each other. A larger number of fins has been found, in many circumstances, to divide the ground into two small portions and accordingly not provide the desired gripping effect into the ground.

The novelty of the signalling post which resides especially in the resiliently pliable and unrecoilingly stretchable section of the tubular member 26 may be used to support of variety of signs through different types of rod members. As shown in FIG. 8, a square rod member is secured to the part 18 of the sleeve 16 depending on the municipal or the state requuirements. Other types rod members such as U-shaped rod member 64, as shown in FIG. 8a, can similarly be used in connection with the present invention.

I claim:

1. A collapsible signalling post comprising,
   an anchoring member adapted to be secured into the ground, said anchoring member having an upwardly directed throat member,
   a tubular member having a lower part, a middle part and an upper part, said lower part being fixed to said throat member, said tubular member extending upwardly from said anchoring member,
   a rod member having a tubular lower end fixed to said upper part of said tubular member, said rod member extending upwardly from said tubular member,
   said middle part having an helical groove carved on the periphery of the middle part of the tubular member, said groove defining a weakened section adapted to split open along a portion thereof upon bending caused by a lateral force exerted on said rod member,
   said groove defining helical whorls adapted to stretch away upon splitting open of the groove, said whorls having a width sufficient for maintaining the lower and the upper part of the tubular member securely connected together after said lateral force has been exerted.

2. A collapsible signalling post as recited in claim 1, wherein the width of each whorl has a minimum of about ⅜ inch.

3. A collapsible signalling post as recited in claim 2, wherein the tubular member is secured inside the throat member of the anchoring member and inside the tubular lower end of the rod members, the said throat member being adjacent the tubular lower end of the rod member.

4. A collapsible signalling post as recited in claim 3, comprising a resilient ring member mounted around said tubular member between said anchoring member and said rod member whereby said ring member is adapted to squeeze upon bending of said tubular member.

5. A collapsible signalling post as recited in claim 4, comprising a flexible link having two ends longitudinally extending inside said tubular member, said link being fixed at one end to said anchoring member and releasably held to said upper part of said tubular member, at the other end, said link having a length adapted to prevent said whorls to stretch beyond a predetermined limit.

6. A collapsible signalling post as recited in claim 5, wherein said link is a chain secured to an axle transversally fixed through said throat member and to a releasable washer adapted to sit on the upper part of said tubular member.

7. A collapsible signalling post as recited in claim 6, wherein said anchoring member has at least two wing plates radially projecting therefrom, said plates having a tapered shape forming a pointed end for digging into the ground.

8. A collapsible signalling post as recited in claim 6, wherein said rod member comprises a connecting member for securing a display column.

9. A collapsible signalling post as recited in claim 2, wherein said tubular member is made of mild steel and has a thickness of about ¼ inch and a groove of about ⅜ said thickness.

10. A collapsible signalling post as recited in claim 9, wherein the tubular member has a diameter of about 1¼ to 2 inches.

* * * * *